United States Patent
Yao et al.

(10) Patent No.: US 11,540,231 B2
(45) Date of Patent: Dec. 27, 2022

(54) METHOD AND DEVICE FOR DETERMINING TRANSMISSION POWER, AND TERMINAL AND STORAGE MEDIUM

(71) Applicant: ZTE Corporation, Guangdong (CN)

(72) Inventors: Ke Yao, Shenzhen (CN); Bo Gao, Shenzhen (CN); Yuxin Wang, Shenzhen (CN); Chuangxin Jiang, Shenzhen (CN); Zhaohua Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 17/188,747

(22) Filed: Mar. 1, 2021

(65) Prior Publication Data

US 2021/0185619 A1 Jun. 17, 2021

Related U.S. Application Data

(63) Continuation of application No. 16/623,289, filed as application No. PCT/CN2018/089646 on Jun. 1, 2018, now Pat. No. 10,939,386.

(51) Int. Cl.
*H04W 52/24* (2009.01)
*H04W 52/14* (2009.01)
(Continued)

(52) U.S. Cl.
CPC ....... *H04W 52/242* (2013.01); *H04W 52/146* (2013.01); *H04W 52/325* (2013.01); *H04W 52/367* (2013.01); *H04W 56/0005* (2013.01)

(58) Field of Classification Search
CPC ............ H04W 52/242; H04W 52/146; H04W 52/325; H04W 52/367; H04W 52/0005
See application file for complete search history.

(56) References Cited

U.S. PATENT DOCUMENTS 9,077,495 B2 * 7/2015 Wang ................ H04W 72/0453
9,730,266 B2 * 8/2017 Womack ........... H04W 56/0015
(Continued)

FOREIGN PATENT DOCUMENTS

CN 102083181 A 6/2011
CN 103037490 A 4/2013
(Continued)

OTHER PUBLICATIONS

International Search Report and Written Opinion for PCT Appl. No. PCT/CN2018/089646 dated Aug. 23, 2018 (with English translation, 9 pages).
(Continued)

*Primary Examiner* — Dominic E Rego
(74) *Attorney, Agent, or Firm* — Foley & Lardner LLP

(57) ABSTRACT

Provided are a method and device for determining transmission power, a terminal and a storage medium. The method includes measuring a first reference signal and determining a pathloss of the first reference signal; determining a pathloss of the uplink transmission according to a type of the uplink transmission, an association relationship between the uplink transmission and the first reference signal, and the pathloss of the first reference signal; determining an power adjustment amount of the uplink transmission; and determining the transmission power of the uplink transmission according to at least one of the pathloss of the uplink transmission or the power adjustment amount of the uplink transmission.

7 Claims, 3 Drawing Sheets

(51) Int. Cl.
*H04W 52/32* (2009.01)
*H04W 52/36* (2009.01)
*H04W 56/00* (2009.01)

(56) References Cited

U.S. PATENT DOCUMENTS

| | | | |
|---|---|---|---|
| 10,165,517 B2* | 12/2018 | Sun | H04W 52/325 |
| 2008/0049668 A1* | 2/2008 | Kaku | H04L 1/20 370/329 |
| 2011/0003557 A1 | 1/2011 | Morita et al. | |
| 2012/0176979 A1 | 7/2012 | Kim et al. | |
| 2012/0202554 A1 | 8/2012 | Seo et al. | |
| 2012/0250742 A1* | 10/2012 | Tiirola | H04B 7/0686 375/296 |
| 2012/0252513 A1* | 10/2012 | Kiyoshima | H04B 17/309 455/509 |
| 2013/0012222 A1 | 1/2013 | Zhu | |
| 2013/0064191 A1 | 3/2013 | Jeong et al. | |
| 2013/0102345 A1 | 4/2013 | Jung | |
| 2013/0176930 A1* | 7/2013 | Lee | H04L 1/1812 370/312 |
| 2013/0322363 A1* | 12/2013 | Chen | H04L 5/0053 370/329 |
| 2014/0010182 A1 | 1/2014 | Chunli et al. | |
| 2014/0022994 A1 | 1/2014 | Pan et al. | |
| 2014/0177531 A1 | 6/2014 | Imamura et al. | |
| 2014/0177601 A1 | 6/2014 | Nishio et al. | |
| 2014/0198747 A1* | 7/2014 | Ouchi | H04L 5/0053 370/329 |
| 2014/0247796 A1 | 9/2014 | Ouchi et al. | |
| 2014/0328298 A1 | 11/2014 | Hooli et al. | |
| 2014/0329553 A1 | 11/2014 | Nakashima et al. | |
| 2015/0124783 A1 | 5/2015 | Li | |
| 2015/0133179 A1 | 5/2015 | Li et al. | |
| 2015/0139003 A1 | 5/2015 | Takahashi et al. | |
| 2015/0215903 A1* | 7/2015 | Zhao | H04W 72/082 370/329 |
| 2015/0271824 A1 | 9/2015 | Zhang et al. | |
| 2015/0358918 A1 | 12/2015 | Gao et al. | |
| 2016/0065278 A1 | 3/2016 | Wang et al. | |
| 2016/0174231 A1 | 6/2016 | Wang | |
| 2016/0227373 A1* | 8/2016 | Tsai | H04W 24/10 |
| 2016/0338089 A1 | 11/2016 | Vos | |
| 2017/0006582 A1* | 1/2017 | Jung | H04W 72/02 |
| 2018/0034529 A1* | 2/2018 | Hessler | H04B 7/024 |
| 2018/0049137 A1 | 2/2018 | Li | |
| 2018/0255607 A1* | 9/2018 | Nagaraja | H04B 7/0695 |
| 2018/0288755 A1 | 10/2018 | Liu et al. | |

FOREIGN PATENT DOCUMENTS

| | | |
|---|---|---|
| CN | 103298091 A | 9/2013 |
| CN | 103814610 A | 5/2014 |
| CN | 103891161 A | 6/2014 |
| CN | 104205697 A1 | 12/2014 |
| CN | 104619000 A | 5/2015 |
| CN | 107734624 A | 2/2018 |
| EP | 2 696 628 A1 | 2/2014 |
| EP | 2 744 261 A1 | 6/2014 |
| WO | WO-2010/035966 A2 | 4/2010 |
| WO | WO-2017/028072 A1 | 2/2017 |

OTHER PUBLICATIONS

Non-Final Office Action on U.S. Appl. No. 16/323,289, dated Jul. 24, 2020 (20 pages).
Third Office Action for CN Appl. No. 201710459678.X, dated Sep. 6, 2021 (with English translation, 11 pages).
ETRI: "Uplink power control for CoMP Scenarios 3 and 4", 3GPP TSG RAN WG1 Meeting #66; R1-112212; Athens, Greece; Aug. 16, 2011 (3 pages).
Extended EP Search Report on EP 18818891.6 dated Feb. 10, 2021 (13 page).
Huawei et al: "Detailed considerations on UL power control design for NR", 3GPP TSG RAN WG1 NR Ad Hoc Meeting; R1-1700064, Spokane, USA; Jan. 16, 2017 (4 pages).
Second Office Action for CN Appl. No. 201710459678, dated Jun. 2, 2021 (with English translation, 18 pages).

* cited by examiner

METHOD AND DEVICE FOR DETERMINING TRANSMISSION POWER, AND TERMINAL AND STORAGE MEDIUM

CROSS REFERENCE TO RELATED APPLICATIONS

This application is a continuation of U.S. patent application Ser. No. 16/623,289 filed on Dec. 16, 2019, which is a national stage application under 35 U.S.C. 371 based on international patent application PCT/CN2018/089646 filed on Jun. 1, 2018, which claims priority to Chinese patent application No. 201710459678.X filed on Jun. 16, 2017. All of these applications are incorporated herein by reference in their entirety.

TECHNICAL FIELD

The present disclosure relates to communications and, specifically, to a method and device for determining transmission power, a terminal and a storage medium.

BACKGROUND

Currently, the new radio (NR) technology is being developed. As the fifth generation mobile communication system, the NR technology needs to support more types of application scenarios than ever, and also needs to support traditional frequency bands, high-frequency bands and beam modes. This brings great challenges to the design of power control.

In the Long Term Evolution (LTE) technology, the transmission power of a sounding reference signal (SRS) is determined based on relevant parameters of a physical uplink shared channel (PUSCH). Relevant parameters of the SRS are directly configured in a cell where the PUSCH is not provided.

In general, the transmission power of the SRS is determined based at least one of the following two parameters: a pathloss and a power adjustment amount. In a traditional LTE scenario, uplink and downlink generally have reciprocity, and pathlosses representing large-scale fading of the uplink and the downlink are not greatly different even in a scenario with poor reciprocity. In addition, the SRS and the PUSCH also have a correspondence relationship. The SRS and the PUSCH share the power adjustment amount, and a base station adjusts a UE transmission-power adjustment amount command according to the reception situation of the PUSCH.

In a multi-beam scenario in NR, in order to implement uplink beam training and uplink channel detection, the SRS is sent through beams. The uplink beam training is to select an appropriate beam/beams, and the uplink channel detection is to accurately measure a channel. The following problems exist in the multi-beam scenario if the SRS is sent in a traditional power-control mode of LTE: 1. since the number of beams of the SRS is relatively large and may be larger than the number of the beams used for PUSCHs, there are some beams which are not used to transmit the PUSCHs. The base station does not send power adjustment amount commands for these beams, so no power adjustment amount can be referred to when the SRS is transmitted on these beams; 2. in the beam scenario, the condition of uplink-downlink reciprocity is stricter, so it is likely that traditional pathlosses reflecting large-scale fading of the uplink and the downlink are also greatly different.

In view of the problem in the related technology that a traditional calculation method in the LTE field is adopted for calculating the transmission power of uplink transmission in the NR field and leads to an inaccurate calculation result, a reasonable solution is not provided yet at present.

SUMMARY

Embodiments of the present disclosure provide a method and device for determining transmission power and a terminal used for solving at least the problem in the related technology that an inaccurate transmission power is obtained when a traditional calculation method in the LTE field is adopted for calculating the transmission power of the uplink transmission in the NR field.

According to one aspect of the present disclosure, a method for determining transmission power is provided. The method includes: measuring a first reference signal and determining a pathloss of the first reference signal; determining a pathloss of the uplink transmission according to a type of the uplink transmission, an association relationship between the uplink transmission and the first reference signal, and the pathloss of the first reference signal; determining a power adjustment amount of the uplink transmission; and determining the transmission power of the uplink transmission according to at least one of the pathloss of the uplink transmission and the power adjustment amount of the uplink transmission.

According to another aspect of the present disclosure, a device for determining transmission power is further provided. The device includes a first determination module, a second determination module, a third determination module and a fourth determination module.

The first determination module is configured to measure a first reference signal and determine a pathloss of the first reference signal.

The second determination module is configured to determine a pathloss of uplink transmission according to a type of the uplink transmission, an association relationship between the uplink transmission and the first reference signal, and the pathloss of the first reference signal.

The third determination module is configured to determine a power adjustment amount of the uplink transmission.

The fourth determination module is configured to determine the transmission power of the uplink transmission according to at least one of the pathloss of the uplink transmission and the power adjustment amount of the uplink transmission.

According to another aspect of the present disclosure, a storage medium is further provided. The storage medium includes stored programs that, when being executed, are used for performing the above-mentioned method for determining transmission power.

According to another aspect of the present disclosure, a terminal is further provided. The terminal includes a processor and a memory which is configured to store instructions executable by the processor. The processor is configured to perform, according to the instructions stored in the memory, the above-mentioned method for determining transmission power.

Through the solution described above, the first reference signal is measured and the pathloss of the first reference signal is determined; then the pathloss of the uplink transmission is determined according to the type of the uplink transmission, the association relationship between the uplink transmission and the first reference signal, and the pathloss of the first reference signal; the power adjustment amount of the uplink transmission is determined according to an indication of a base station; and then, the transmission power of the uplink transmission is determined according to at least one of the pathloss of the uplink transmission and the power adjustment amount of the uplink transmission. Thus, the problem in the related technology that an inaccurate transmission power is obtained when a traditional calculation method in the LTE field is adopted for calculating the transmission power of the uplink transmission in the NR field is solved, the related pathloss and power adjustment amount can be accurately calculated in multi-beam uplink transmission of the NR and thereby the transmission power of the uplink transmission with high reliability is obtained.

BRIEF DESCRIPTION OF DRAWINGS

The drawings described herein are used to provide a further understanding of the present disclosure and form a part of the present application. The exemplary embodiments and descriptions thereof in the present disclosure are used to explain the present disclosure and not to limit the present disclosure in any improper way. In the drawings.

DETAILED DESCRIPTION

The present disclosure will be described hereinafter in detail with reference to the drawings in conjunction with the embodiments. It is to be noted that if not in collision, the embodiments and features therein in the present application may be combined with each other.

It is to be noted that the terms "first", "second" and the like in the description, claims and drawings of the present disclosure are used to distinguish between similar objects and are not necessarily used to describe a particular order or sequence. It should be understood that the data used in this way is interchangeable where appropriate so that the embodiments of the present disclosure described herein may also be implemented in a sequence not illustrated or described herein. In addition, the terms "comprising", "including" or any other variations thereof described herein are intended to encompass a non-exclusive inclusion. For example, a process, method, system, product or device having a series of steps or units not only includes the expressly listed steps or units but may also include other steps or units that are not expressly listed or are inherent to such process, method, product or device.

Embodiment One

Figure 1:
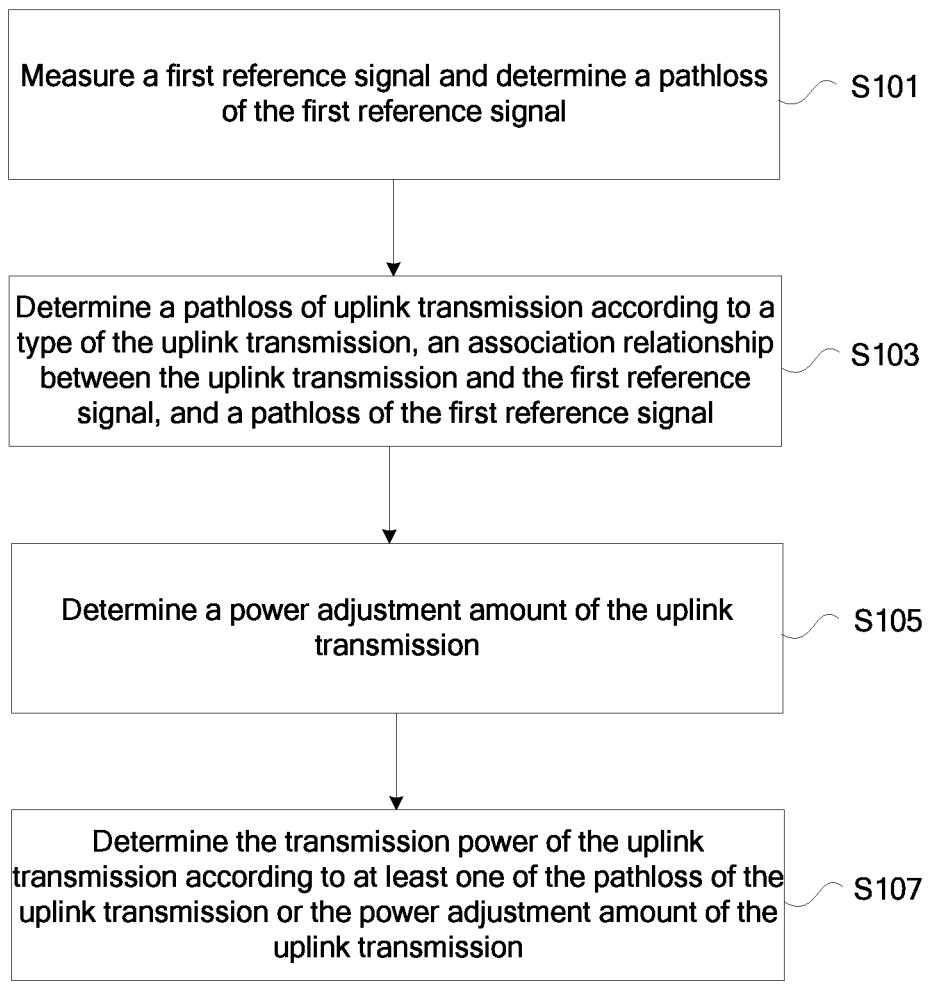
FIG. 1 is a flowchart illustrating an optional method for determining transmission power according to an embodiment of the present disclosure.

A method for determining transmission power is provided in the embodiment of the present disclosure. FIG. 1 is a flowchart illustrating an optional method for determining transmission power according to the embodiment of the present disclosure. As shown in FIG. 1, an optional process of the method for determining transmission power includes the steps described below.

In S101, a first reference signal is measured, and a pathloss of the first reference signal is determined.

In step S103, a pathloss of uplink transmission is determined according to the type of the uplink transmission, the association relationship between the uplink transmission and the first reference signal, and the pathloss of the first reference signal.

In step S105, a power adjustment amount of the uplink transmission is determined.

In step S107, the transmission power of the uplink transmission is determined according to at least one of the pathloss of the uplink transmission and the power adjustment amount of the uplink transmission.

Through the method described above, the first reference signal is measured and the pathloss of the first reference signal is determined; then the pathloss of the uplink transmission is determined according to the type of the uplink transmission, the association relationship between the uplink transmission and the first reference signal, and the pathloss of the first reference signal; the power adjustment amount of the uplink transmission is determined according to an indication of a base station; and the transmission power of the uplink transmission is determined according to at least one of the pathloss of the uplink and the power adjustment amount of the uplink transmission. Thus, the problem in the related technology that an inaccurate transmission power is obtained when a traditional calculation method in the LTE field is adopted for calculating the transmission power of the uplink transmission in the NR field is solved, and the related pathloss and power adjustment amount in multi-beam uplink transmission in the NR can be accurately calculated and thereby the transmitting power of the uplink transmission with high reliability is obtained.

In an embodiment, the type of the uplink transmission includes at least one of PUSCH transmission, physical uplink control channel (PUCCH) transmission and SRS transmission.

In an embodiment, the association relationship between the uplink transmission and the first reference signal includes that the uplink transmission and the first reference signal satisfy a channel feature assumption. When the type of the uplink transmission is the PUSCH transmission, a demodulation reference signal (DMRS) of the PUSCH transmission and the first reference signal satisfy at least one of a quasi co-location assumption, a reciprocal quasi co-location assumption, a spatial reciprocal quasi co-location assumption, a beam association or an uplink-downlink reference-signal association. When the type of the uplink transmission is the PUCCH transmission, a DMRS of the PUCCH transmission and the first reference signal satisfy at least one of the quasi co-location assumption, the reciprocal quasi co-location assumption, the spatial reciprocal quasi co-location assumption, the beam association or the uplink-downlink reference-signal association. When the type of the uplink transmission is the SRS transmission, the SRS transmission and the first reference signal satisfy at least one of the quasi co-location assumption, the reciprocal quasi co-location assumption, the spatial reciprocal quasi co-location assumption, the beam association or the uplink-downlink reference-signal association.

In an embodiment, the association relationship between the uplink transmission and the first reference signal may further be that a transmit beam for the uplink transmission is associated with a receive beam for the first reference signal.

In an embodiment, the association relationship between the uplink transmission and the first reference signal may further be that a transmit mode of the uplink transmission corresponds to the same beam or beam set of a UE as a receive mode of the first reference signal.

In an embodiment, the first reference signal is a set including L reference signals and L is an integer greater than or equal to 1. In this case, the terminal determines the pathloss of the first reference signal by determining L pathlosses in one-to-one correspondence with the L reference signals according to the first reference signal.

In an embodiment, the terminal determines the pathloss of an uplink-transmission path according to the L pathlosses in one of the following manners: taking the maximum value of the L pathlosses; taking the minimum value of the L pathlosses or taking a weighted average of the L pathlosses.

In an embodiment, the method further includes that: the terminal determines a transmit mode and/or the receive mode of the uplink transmission based on indication information about a resource of a second reference signal, or the transmit mode and/or the receive mode of the uplink transmission is a predefined by the terminal.

In an embodiment, the resource of the second reference signal includes one of a time-domain resource, a frequency-domain resource, or a transmit mode and/or a receive mode for transmission of a second reference signal. The indication information about the resource of the second reference signal is used for selecting Y resources of the second reference signal from X resources of the second reference signal. X is an integer greater than or equal to 1, Y is an integer greater than or equal to 1, and Y is less than X.

In an embodiment, the first reference signal and the second reference signal are same or different in type, and when the first reference signal and the second reference signal are same in type, the second reference signal is a subset of the first reference signal.

In an embodiment, the first reference signal includes at least one of a channel state information-reference signal (CSI-RS), a secondary synchronization signal (SSS), or a DMRS of a physical broadcast channel (PBCH); and the second reference signal includes at least one of the CSI-RS, the SRS, the SSS, or the DMRS of the PBCH.

In an embodiment, the method further includes that the terminal updates the power adjustment amount of the uplink transmission according to an indication from the base station, or that the terminal updates the power adjustment amount of the uplink transmission within a preset time.

It is to be noted that the power adjustment amount has a validity period, and if no update is performed within a predetermined time, then the power adjustment amount expires. The predetermined time is a preconfigured time and may be the number of slots, the number of subframes, the number of frames, the number of orthogonal frequency division multiplexing (OFDM) symbols, or may be several microseconds, milliseconds or seconds. When the power adjustment amount of a link where transmission is to be performed does not expire, the power adjustment amount and the PL of the link where the transmission is to be performed are used for calculating the transmission power. When the power adjustment amount of the link where the transmission is to be performed does not exist or expires, reference is made to an unexpired power adjustment amount of other links of the sender of the link where the transmission is to be performed. When the number of reference power adjustment amounts satisfying the condition is greater than 1, multiple reference power adjustment amount values jointly determine an integrated power adjustment amount, and such integrated power adjustment amount and the PL of the link where the transmission is to be performed are used for calculating the transmission power.

In an embodiment, the terminal determines the transmission power of the uplink transmission as follows: when a beam failure recovery request is to be first sent through the uplink transmission, the terminal determines the transmission power for first sending the beam failure recovery request as first power.

In an embodiment, the method further includes that: in response to determining that the terminal detects no response to the beam failure recovery request in one or more PDCCH search spaces after the beam failure recovery request is first sent, the terminal determines transmission power for resending the beam failure recovery request as second power; or in response to determining that the terminal detects no response to the beam failure recovery request in one or more PDCCH search spaces after the beam failure recovery request is first sent and the terminal determines that the number of transmissions does not exceed a preset maximum transmission number and/or an accumulated duration does not exceed a preset timing threshold if the beam failure recovery request is resent, the terminal determines the transmission power for resending the beam failure recovery request as the second power.

In an embodiment, the first power is determined in the following manner: the terminal determines a resource for transmission of the beam failure recovery request, and the terminal determines the first power according to a transmit mode and/or a receive mode for the transmission of the beam failure recovery request. It is to be noted that the transmit mode here includes a transmit beam, and the receive mode here includes a receive beam.

In an embodiment, the second power is determined in the following manner: on the premise preset maximum transmission power is not exceeded, the second power is a sum of transmission power for a previous transmission of the beam failure recovery request and a power rampup value (deltaP_rampup). The power rampup value (deltaP_rampup) is directly configured or determined by the terminal according to the following formula: deltaP_rampu=max {default rampup value, (maximum transmission power−first power)/(maximum transmission number−1)}.

The default rampup value and the maximum transmission number are directly configured, and the maximum transmission power is calculated according to a preset rule or directly configured.

The power adjustment for resending beam failure recovery request information of a beam failure makes the beam failure recovery request information more robust, thereby contributing to fast resuming links.

In an embodiment, when the type of the uplink transmission is determined to be the SRS transmission according to the indication from the base station and the uplink transmission is used for beam sweeping, the terminal groups SRS resources according to a preset condition, and the SRS in the same group uses the same transmission power. The preset condition includes at least one of: sounding reference signal ports satisfying a channel feature assumption, or reference signal antenna ports indicated by the same downlink reference-signal index when the reciprocity is satisfied.

It is to be noted that in beam sweeping, transmission power is set for each group of beams respectively, so that more appropriate power can be selected for each group of beams, thereby avoiding the limitation of using uniform transmission power. When a UE (terminal) performs uplink beam sweeping, one or more SRS resources satisfy the channel feature assumption, or an SRS antenna port indicated by the same downlink reference-signal index uses the same transmission power under reciprocity. The channel feature assumption includes at least one of a QCL assumption, a reciprocal QCL assumption, a spatial QCL assumption or a spatial reciprocal QCL assumption.

If an SRS group using the same transmission power has an unexpired power adjustment amount, then the unexpired power adjustment amount and the PL value of the SRS corresponding to the unexpired power adjustment amount are used for calculating the transmission power of the SRS group.

If a first SRS group using the same transmission power has no unexpired power adjustment amount and has an SRS with a valid PL value, and a second SRS group of the UE has an unexpired power adjustment amount, then an alternative power adjustment amount of the first SRS group is calculated with reference to the unexpired power adjustment amount in the second SRS group. The alternative power adjustment amount and the PL value of the first SRS group are used for calculating the transmission power of the first SRS group.

If the first SRS group using the same transmission power has no unexpired power adjustment amount and has no SRS with the valid PL value, then the UE takes the maximum transmission power of other SRS groups as the transmission power of the first SRS group.

Embodiment Two

A device for determining transmission power is further provided in this embodiment. The device is used for implementing the embodiments and preferred embodiments described above. What has been described will not be repeated. The term "module" used hereinafter may be software, hardware or a combination thereof capable of implementing predetermined functions. The device in the embodiment described below is preferably implemented by software, but implementation by hardware or by a combination of software and hardware is also possible and conceived.

Figure 2:
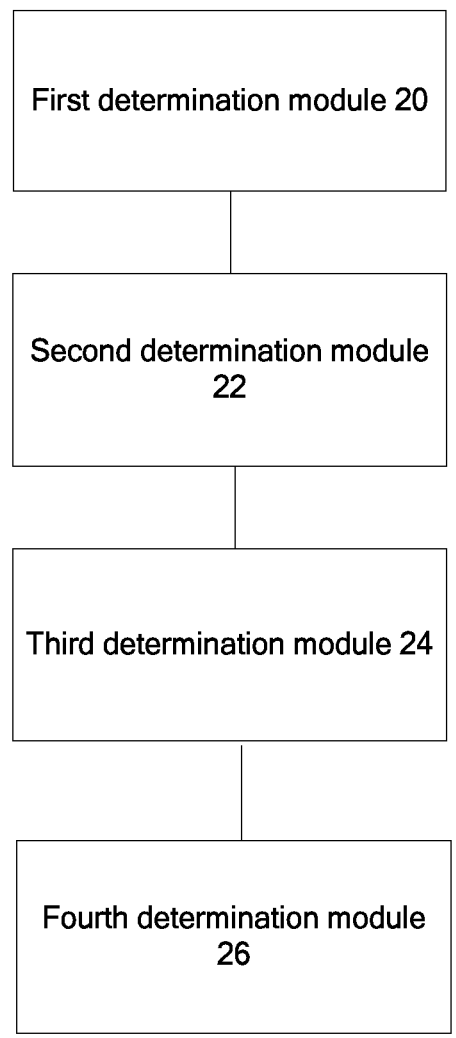
FIG. 2 is a structural block diagram illustrating an optional device for determining transmission power according to an embodiment of the present disclosure.

According to the embodiment of the present disclosure, a device for performing the above-mentioned method for determining transmission power is further provided. The device is applied to a terminal. FIG. 2 is a structural block diagram illustrating an optional apparatus for determining transmission power according to the embodiment of the present disclosure. As shown in FIG. 2, the device includes a first determination module 20, a second determination module 22, a third determination module 24 and a fourth determination module 26.

The first determination module 20 is configured to measure a first reference signal sent from a base station and determine a pathloss of the first reference signal.

The second determination module 22 is configured to determine a pathloss of uplink transmission according to a type of the uplink transmission and an association relationship between the uplink transmission and the first reference signal determined through an indication from the base station, as well as the pathloss of the first reference signal.

The third determination module 24 is configured to determine a power adjustment amount of the uplink transmission according to the indication from the base station.

The fourth determination module 26 is configured to determine the transmission power of the uplink transmission according to at least one of the pathloss of the uplink transmission and the power adjustment amount of the uplink transmission.

Through the device described above, the first determination module 20 measures the first reference signal sent from the base station and determines the pathloss of the first reference signal; the second determination module 22 determines the type of the uplink transmission, and the association relationship between the uplink transmission and the first reference signal according to the indication from the base station, and determines the pathloss of the uplink transmission according to the association relationship, the type of the uplink transmission, and the pathloss of the first reference signal; the third determination module 24 determines the power adjustment amount of the uplink transmission according to the indication from the base station; and the fourth determination module 26 determines the transmission power of the uplink transmission according to at least one of the pathloss of the uplink transmission and the power adjustment amount of the uplink transmission. Thus, the problem in the related technology that an inaccurate transmission power is obtained when a traditional calculation method in the LTE field is adopted for calculating the transmission power of the uplink transmission in the NR field is solved, and the related pathloss and power adjustment amount in multi-beam uplink transmission in the NR can be accurately calculated and the transmitting power of the uplink transmission with high reliability is obtained.

In an embodiment, the type of the uplink transmission includes at least one of PUSCH transmission, PUCCH transmission and SRS transmission.

In an embodiment, the association relationship between the uplink transmission and the first reference signal includes that the uplink transmission and the first reference signal satisfy a channel feature assumption. When the type of the uplink transmission is the PUSCH transmission, a DMRS of the PUSCH transmission and the first reference signal satisfy at least one of a quasi co-location assumption, a reciprocal quasi co-location assumption, a spatial reciprocal quasi co-location assumption, a beam association or an uplink-downlink reference-signal association. When the type of the uplink transmission is the PUCCH transmission, a DMRS of the PUCCH transmission and the first reference signal satisfy at least one of the quasi co-location assumption, the reciprocal quasi co-location assumption, the spatial reciprocal quasi co-location assumption, the beam association or the uplink-downlink reference-signal association. When the type of the uplink transmission is the SRS transmission, the SRS transmission and the first reference signal satisfy at least one of the quasi co-location assumption, the reciprocal quasi co-location assumption, the spatial reciprocal quasi co-location assumption, the beam association or the uplink-downlink reference-signal association.

In an embodiment, the first reference signal is a set including L reference signals and L is an integer greater than or equal to 1. The first determination module includes a first determination uni configured to determine L pathlosses in one-to-one correspondence with the L reference signals according to the first reference signal.

In an embodiment, the first determination unit is further configured to acquire the maximum value of the L pathlosses; acquire the minimum value of the L pathlosses or acquire a weighted average of the L pathlosses.

In an embodiment, the second determination module further includes a second determination unit configured to determine a transmit mode and/or a receive mode of the uplink transmission based on indication information, sent from the base station, about a resource of a second reference signal; and a third determination unit configured to determine the transmit mode and/or the receive mode of the uplink transmission in a predefined manner.

In an embodiment, the resource of the second reference signal includes one of a time-domain resource, a frequency-domain resource, or a transmit mode and/or a receive mode for transmission of a second reference signal. The indication information about the resource of the second reference signal is used for selecting Y resources of the second reference signal from X resources of the second reference signal. X is an integer greater than or equal to 1, Y is an integer greater than or equal to 1, and Y is less than X.

In an embodiment, the first reference signal and the second reference signal are the same or different in type, and when the first reference signal and the second reference signal are the same in type, the second reference signal is a subset of the first reference signal.

In an embodiment, the first reference signal includes at least one of a CSI-RS, a SSS, or a DMRS of a PBCH; and the second reference signal includes at least one of the CSI-RS, the SRS, the SSS, or the DMRS of the PBCH.

In an embodiment, the device further includes a first update module configured to update the power adjustment amount of the uplink transmission according to the indication from the base station.

It is to be noted that the power adjustment amount has a validity period. If no update is performed within a predetermined time, then the power adjustment amount expires. The predetermined time is a preconfigured time, and may be the number of slots, the number of subframes, the number of frames, the number of OFDM symbols, or several microseconds, milliseconds or seconds. When the power adjustment amount of a link where transmission is to be performed does not expire, the power adjustment amount and the PL of the link where the transmission is to be performed are used for calculating the transmission power. When the power adjustment amount of the link where the transmission is to be performed does not exist or expires, reference is made to an unexpired power adjustment amount of other links of the sender of the link where the transmission is to be performed. When there are more than one reference power adjustment amounts satisfying the condition, values of multiple reference power adjustment amounts are used to jointly determine an integrated power adjustment amount, and such integrated power adjustment amount and the PL of the link where the transmission is to be performed are used for calculating the transmission power.

In an embodiment, the fourth determination module is further configured to, when a beam failure recovery request is to be first sent through the uplink transmission, determine the transmission power for first sending the beam failure recovery request as first power.

In an embodiment, the fourth determination is further configured such that: in response to determining that the terminal detects no response from the base station in one or more PDCCH search spaces after the beam failure recovery request is first sent, the terminal determines transmission power for resending the beam failure recovery request as second power; or in response to determining that the terminal detects no response from the base station in one or more PDCCH search spaces after the beam failure recovery request is first sent, and the terminal determines that the number of transmissions does not exceed a preset maximum transmission number and/or an accumulated duration does not exceed a preset timing threshold if the beam failure recovery request is resent, the transmission power for resending the beam failure recovery request is determined as the second power.

In an embodiment, the first power is determined in the following manner: the terminal determines a resource for transmission of the beam failure recovery request, and the terminal determines the first power according to a transmit mode and/or a receive mode for the transmission of the beam failure recovery request.

In an embodiment, the second power is determined in the following manner: on the premise that preset maximum transmission power is not exceeded, the second power is a sum of transmission power for a previous transmission of the beam failure recovery request and deltaP_rampup. DeltaP_rampup is directly configured or deltaP_rampup is determined according to the following formula: deltaP_rampu=max {default rampup value, (maximum transmission power−first power)/(maximum transmission number−1)}.

The default rampup value and the maximum transmission number are directly configured, and the maximum transmission power is calculated by the UE according to a preset rule or directly configured.

In an embodiment, when it is determined by the second determination module according to the indication from the base station that the type of the uplink transmission is the SRS transmission and the uplink transmission is used for beam sweeping, the device further includes a grouping module. The grouping module is configured to divide SRS resources into groups according to a preset condition when the terminal performs uplink beam sweeping. The SRSs in the same group use the same transmission power. The preset condition includes at least one of sounding reference signal ports satisfying a channel feature assumption, or reference-signal antenna ports indicated by the same downlink reference-signal index when the reciprocity is satisfied.

It is to be noted that in beam sweeping, transmission power is set for each group respectively, so that more appropriate power can be selected for each group of beams, thereby avoiding the limitation of using uniform transmission power. When a UE (terminal) performs uplink beam sweeping, one or more SRS resources satisfying the channel feature assumption or antenna ports of the SRS indicated by the same downlink reference-signal index use the same transmission power under reciprocity. The channel feature assumption includes at least one of a QCL assumption, a reciprocal QCL assumption, a spatial QCL assumption or a spatial reciprocal QCL assumption.

If an SRS group using the same transmission power has an unexpired power adjustment amount, then the unexpired power adjustment amount and the PL value of the SRS corresponding to the unexpired power adjustment amount are used for calculating the transmission power of the SRS group.

If a first SRS group using the same transmission power has no unexpired power adjustment amount and has an SRS with a valid PL value, and a second SRS group of the UE has an unexpired power adjustment amount, then an alternative power adjustment amount of the first SRS group is calculated with reference to the unexpired power adjustment amount in the second SRS group. The alternative power adjustment amount and the PL value of the first SRS group are used for calculating the transmission power of the first SRS group.

If the first SRS group using the same transmission power has no unexpired power adjustment amount and has no SRS with the valid PL value, then the UE takes the maximum transmission power of other SRS groups as the transmission power of the first SRS group.

According to another aspect of the present disclosure, a storage medium is provided. The storage medium includes stored programs. When the stored programs are executed, the method and preferred embodiments thereof described above are performed.

Figure 3:
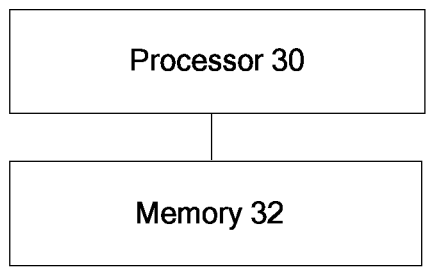
FIG. 3 is a structural block diagram illustrating an optional terminal according to an embodiment of the present disclosure.

In order that the solution described above may be better understood, the embodiment of the present disclosure further provides a terminal. The terminal is configured to perform the above-mentioned method for determining transmission power, and may be used as a bearer body of the above-mentioned device. FIG. 3 is a structural block diagram illustrating an optional terminal according to the embodiment of the present disclosure. As shown in FIG. 3, the embodiment of the present disclosure further provides a terminal. The terminal includes a processor 30 and a memory 32 which is configured to store instructions executable by the processor 30. The processor 30 is configured to perform the following operations according to the instructions stored in the memory 32: measuring a first reference signal sent by a base station and determining a pathloss of the first reference signal; determining a type of the uplink transmission, and an association relationship between the uplink transmission and the first reference signal according to an indication from the base station, and determining a pathloss of uplink transmission from the pathloss of the first reference signal according to the association relationship; determining a power adjustment amount of the uplink transmission according to the indication from the base station; and determining the transmission power of the uplink transmission according to at least one of the pathloss of the uplink transmission and the power adjustment amount of the uplink transmission.

Through the terminal described above, the processor 30 performs the following operations according to the instructions stored in the memory 32: measuring the first reference signal sent by the base station and determining the pathloss of the first reference signal; determining the type of the uplink transmission, and the association relationship between the uplink transmission and the first reference signal according to the indication from the base station, and determining the pathloss of the uplink transmission from the pathloss of the first reference signal according to the association relationship; determining the power adjustment amount of the uplink transmission according to the indication from the base station; and determining the transmission power of the uplink transmission according to at least one of the pathloss of the uplink transmission and the power adjustment amount of the uplink transmission. Thus, the problem in the related technology that an inaccurate transmission power is obtained when a traditional calculation method in the LTE field is adopted for calculating the transmission power of the uplink transmission in the NR field is solved, and the related pathloss and power adjustment amount in multi-beam uplink transmission of the NR can be accurately calculated and thereby the transmitting power of the uplink transmission with high reliability is obtained.

In an embodiment, the type of the uplink transmission includes at least one of PUSCH transmission, PUCCH transmission and SRS transmission.

In an embodiment, the association relationship between the uplink transmission and the first reference signal includes that the uplink transmission and the first reference signal satisfy a channel feature assumption. When the type of the uplink transmission is the PUSCH transmission, a DMRS of the PUSCH transmission and the first reference signal satisfy at least one of a quasi co-location assumption, a reciprocal quasi co-location assumption, a spatial reciprocal quasi co-location assumption, a beam association or an uplink-downlink reference-signal association. When the type of the uplink transmission is the PUCCH transmission, a DMRS of the PUCCH transmission and the first reference signal satisfy at least one of the quasi co-location assumption, the reciprocal quasi co-location assumption, the spatial reciprocal quasi co-location assumption, the beam association or the uplink-downlink reference-signal association. When the type of the uplink transmission is the SRS transmission, the SRS transmission and the first reference signal satisfy at least one of the quasi co-location assumption, the reciprocal quasi co-location assumption, the spatial reciprocal quasi co-location assumption, the beam association or the uplink-downlink reference-signal association.

In an embodiment, the processor is further configured to perform the following operations according to the instructions stored in the memory: determining a transmit mode and/or the receive mode of the uplink transmission according to indication information, sent by the base station, about a resource of a second reference signal, or determining the transmit mode and/or the receive mode of the uplink transmission in a predefined manner.

In an embodiment, the resource of the second reference signal includes one of a time-domain resource, a frequency-domain resource, or a transmit mode and/or a receive mode of a second reference signal. The indication information about the resources of the second reference signal is used for selecting Y resources of the second reference signal from X resources of the second reference signal. X is an integer greater than or equal to 1, Y is an integer greater than or equal to 1, and Y is less than X.

In an embodiment, the processor is further configured to perform the following operation according to the instructions stored in the memory: when a beam failure recovery request is to be first transmitted through the uplink transmission, the terminal determines the transmission power for first transmitting the beam failure recovery request as first power.

In an embodiment, the processor is further configured to perform the following operations according to the instructions stored in the memory: in response to determining that the terminal detects no response to the beam failure recovery request in one or more PDCCH search spaces after the beam failure recovery request is first sent, the terminal determines transmission power for resending the beam failure recovery request as second power; or in response to determining that the terminal detects no response to the beam failure recovery request in one or more PDCCH search spaces after the beam failure recovery request is first sent and the terminal determines that the number of transmissions does not exceed a preset maximum transmission number and/or an accumulated duration does not exceed a preset timing threshold if the beam failure recovery request is resent, the terminal determines the transmission power for resending the beam failure recovery request as the second power.

The terminal provided in the embodiment of the present disclosure is further used for implementing the method for determining transmission power and preferred embodiments thereof described above. What has been described will not be repeated.

Embodiment Three

In order that the solution of the present disclosure is better understood, the embodiments of the present disclosure will be further illustrated through examples described below.

In a radio communication system, the transmission power is required to be controlled during transmission to reduce power consumption of a transmit device and reduce interference to other transmission due to unnecessary high-power transmission. The transmission power is affected by factors such as the range of the communication, maximum transmission power and receive sensitivities of transceiving devices of both parties in the communication, a modulation and coding scheme and the rate of data, an operating frequency band, and a bandwidth occupied by transmission. Generally, lower transmission power needs to be used as much as possible under the condition that a quality requirement of a received signal at a receive end is satisfied.

In the general communication technology, communication node 1 sends a reference signal, and communication node 2 measures a pathloss (PL) from node 1 to node 2 based on the reference signal. PL is equal to the transmission power of the reference signal at node 1 minus the power of the reference signal received at node 2. Assuming that the PL of a transmission channel from node 2 to node 1 is the same as the PL of a channel from node 1 to node 2, the transmission power is set such that the power received at the receive end can satisfy receiving requirement. Since PL is single-sided measured, this factor belongs to the open-loop part of the transmission power. Node 2 receives the transmission and then performs analyzing, and provides node 1 with power adjustment information according to the receive quality. This process is closed-loop power control. In LTE, a link from a base station to a terminal is a downlink, and a link from the terminal to the base station is an uplink. The power of the downlink is determined by the base station according to a channel-measurement result of each scheduled UE and a scheduling algorithm. Uplink power is controlled in a manner of the open loop control combined with the closed loop control. A power-control factor depending on UE measurement belongs to the open-loop part, and a power-control factor measured by the base station and fed back to the UE belongs to the closed-loop part. In addition, there are certain quantities related to the transmission, such as a transmit rate, a MCS level, a transmit bandwidth and the like.

A formula for calculating the transmission power of a PUSCH in the LTE is as follows:

$$P_{PUSCH}(i) = \min\{P_{CMAX}, 10\log_{10}(M_{PUSCH}(i)) + P_{O\_PUSCH}(j) + \alpha(j)\cdot PL + \Delta_{TF}(i) + f(i)\}$$

where the terms represent: Configured maximum power limitation of a UE; Number of resource blocks; Open-loop part; MCS-related power offset; Closed-loop power-control command.

The open-loop part of the power $P_{PUSCH}$ of uplink transmission for the PUSCH depends on target received power $P_{O\_PUSCH}$, a pathloss amount PL and a pathloss factor α. The target received power is classified into a cell-level parameter and a UE-level parameter which are determined by the base station and configured for the UE. The closed-loop part is a power adjustment amount f determined by the base station according to the difference between a measurement result and the target and then dynamically sent to the UE. ATF denotes a MCS-related power offset, i denotes a subframe number, and $P_{CMAX}$ denotes the maximum power limitation of the UE. The adjustment of the closed-loop part is classified into an accumulation mode and an absolute-value mode. The absolute-value mode is to update the closed-loop power adjustment amount directly through a power adjustment amount sent by the base station. The accumulation mode is to add the power adjustment value sent by the base station to the historical value of the power adjustment value to determine the closed-loop power adjustment amount.

In the 5G technology, a beam transmission mode is introduced and both the base station and the UE support multiple-beam mode. In a beam operating mode, the power calculation needs to take into account features of a beam. The present disclosure provides a power-control method in a multi-beam mode.

Various beam-related concepts have been used in the description of the present disclosure. For ease of understanding, the following explanation is made.

The transmit mode includes at least one of a transmit beam, a transmit port, a transmit resource, a reference-signal sequence or a transmit precoding matrix (in an analog, digital or hybrid manner).

The receive mode includes at least one of a receive beam, a receive port, a receive resource, a reference-signal sequence, a receive precoding matrix (in an analog, digital or hybrid manner) or a receiver algorithm.

The beam may be a resource (such as transmit-end precoding, receive-end precoding, an antenna port, an antenna weight vector and an antenna weight matrix). A beam serial number may be replaced with a resource index since the beam may be bound to some time-frequency code resources for transmission. The beam may also be a transmission (transmit/receive) mode. The transmission mode may include space multiplexing, frequency-domain/time-domain diversity or the like.

Beam indication refers to that a transmit end may indicate assuming that a current reference signal and antenna port, and a reference signal (or a standard reference signal) and antenna port swept by the base station or fed back and reported by the UE satisfy a quasi co-location (QCL) assumption.

The receive beam refers to a beam at the receive end and not needing to be indicated, or a beam resource at the receive end and indicated by the transmit end through the QCL between the current reference signal and antenna port and the reference signal (or standard reference signal) and antenna port swept by the base station or fed back and reported by the UE.

The channel feature includes features of a physical propagation channel, such as a horizontal transmit azimuth, a vertical transmit azimuth, a horizontal receive azimuth and a vertical receive azimuth, and also includes features of radio-frequency and baseband circuits, such as an antenna element pattern, an antenna group, an antenna panel, an antenna subarray, a transceiving unit (TXRU), a receive-beam set, antenna placement, a baseband time offset, a frequency offset and phase noise and the like.

Parameters related to the QCL at least include: a Doppler spread, a Doppler shift, a delay spread, an average delay and an average gain, and may also include spatial parameter information, such as an arrival azimuth, a spatial correlation of the receive beam, the average delay and a time-frequency channel response correlation (including phase information).

The uplink-downlink reference-signal association refers to that a spatial parameter feature of an uplink (downlink) reference signal may be determined according to a spatial parameter feature of a channel for the downlink (uplink) reference signal, that is, the uplink-downlink reference-signal association is also referred to as satisfying the QCL assumption, or satisfying the spatial reciprocal QCL assumption. Specifically, a transmit beam for the uplink reference signal may be determined according to a corresponding receive beam of the downlink reference signal, a transmit beam for the downlink reference signal may be determined according to a corresponding receive beam for the uplink reference signal, a receive beam for the uplink reference signal may be determined according to a corresponding transmit beam for the downlink reference signal, and a receive beam for the downlink reference signal may be determined according to a corresponding transmit beam for the uplink reference signal.

In the embodiments of the present disclosure, for ease of description, a base station and a user equipment (UE) are used for description, but are not intended to limit the present disclosure. In the implementation process, the base station and the UE may be replaced with the names of various communication nodes, such as an NB (NodeB), a gNB, a TRP (transmitter receiver point), an AP (access point), a station, a user, a STA, a relay, a terminal or the like.

The implementation of the technical solution will be further described in detail with reference to preferred embodiments.

Preferred Embodiment One

A base station configures a CSI-RS for a UE to perform downlink PL measurement, and may configure that DL 1 TX beam (downlink transmit beam) corresponds to multiple RX beams (uplink receive beams), that is, an uplink receive-beam group. In view of the poor reciprocity, the configuration where multiple DL multiple TX beams correspond to 1 RX beam or RX beam group may be used, and the averaged PL of multiple downlinks may be used as a reference PL of an uplink.

A link from the base station to the UE is a downlink, the UE measures a reference signal from the base station to obtain reference signal received power (RSRP), and the difference between the transmission power of the reference signal and the RSRP is a pathloss (PL).

M beams are configured on the base-station side and are in one-to-one correspondence with M beam IDs. N beams are configured on the UE side and in one-to-one correspondence with N beam IDs. The downlink and the uplink theoretically exist between each beam on the base-station side and each beam on the UE side. The link between each beam of the base station and each beam of the UE is called a beam pair link (BPL).

The UE measures the PL of each BPL, selects several BPLs having lowest PL and reports the selected BPLs to the base station. The base station schedules downlink transmission on these BPLs and determines a transmit beam of the base station and/or a receive beam of the UE.

The base station uses a specific beam to send the reference signal, so that the UE receives the reference signal on a specific beam and measures the RSRP, thereby obtaining the PL of the BPL between the transmit beam and the receive beam. The reference signal may be an SSS in an NR-SS signal or a DMRS of a primary broadcast channel (PBCH), or may be a channel state information-reference signal (CSI-RS). When the base station measures the uplink, a pilot signal sent by the UE may be the DMRS or the SRS.

In the scenario of uplink-downlink reciprocity, the PL of each downlink BPL may be used as the PL of the uplink BPL of the same beam pair.

In the multi-beam scenario, multiple beams on the base-station side or multiple beams on the UE side may have a similar channel feature, for example, the PL values of the BPLs from the multiple beams of the base station to one beam of the UE are similar, or the PL values of the BPLs from one beam of the base station to the multiple beams of the UE are slightly different. At this time, the multiple beams may form a group. Each group is identified through a beam-group ID. The result of PL measurement of one beam in the group may represent PL results of all beams in the whole group, or a weighted average of the PL results of several beams in the group may represent the PL result of all beams in the whole group. This has the advantage of reducing indication overhead.

When the downlink reference signal is used for measuring the PL, the UE receives the downlink reference signal on the receive beam to obtain the PL of the BPL from the transmit beam for the downlink reference signal to the receive beam of the UE; or the UE selects one or more beams from the receive-beam group for receiving the downlink reference signal to obtain the PLs of one or more BPLs. When there is only one PL, BPLs between all beams in the beam group of the UE and the transmit beam for the downlink reference signal are set to have this PL value. When there are multiple PL values, multiple PL values are mapped onto the BPLs between all beams in the beam group and the transmit beam for the downlink reference signal in a mapping manner. The mapping manner may be any one of: 1. selecting the maximum value of the multiple PLs; 2. selecting the minimum value of the multiple PLs; and 3. calculating a weighted average of the multiple PLs. In the scenario of uplink-downlink reciprocity, the PL of a downlink BPL may be used as the PL of the uplink BPL of the same beam pair.

When the uplink-downlink reciprocity is unreliable, the PL of one downlink BPL link may be replaced with PL results of multiple downlink BPLs, so that the problem in which the PL of the downlink of a single beam pair is greatly different from the PL of the uplink of the single beam pair is solved.

The reference signal may be a reference-signal set including L reference signals. The transmit beam for each reference signal is a different beam of the base station, and the receive beam for each reference signal is the same beam of the UE. Then, transmit beams for the reference-signal set include L beams of the base station. The set may be used to determine L PLs in one-to-one correspondence with the links from the L beams of the base station to the same beam of the UE. L is an integer greater than or equal to 1.

In theory, during uplink scheduling the UE may know the PLs of the BPLs between all transmit beams of the base station and all receive beams of the UE. The base station indicates only the uplink transmit beam (group) of the UE in uplink scheduling information, and does not indicate the receive beam (group) of the base station. Then, the UE needs to select an appropriate beam among some related beams to calculate the PL. The PL has certain uncertainty in transmit-power calculation because the receive beam of the base station needs to be assumed by the UE. The UE should assume that the base station adopts one or more beams corresponding to the transmit beam of the UE and in one-to-one correspondence with lowest uplink PL as the receive beam.

Alternatively, the base station indicates only the receive beam (group) of the base station for the UE in the uplink scheduling information, and the UE selects the transmit beam (group) by itself. In this case, the selection of PL in the transmit-power calculation is relatively reliable.

Alternatively, the base station indicates the transmit beam (group) and the receive beam (group) for the UE in the uplink scheduling information, and then the UE uses the specified transmit beam (group) to send uplink information. In this case, the selection of PL in the transmit-power calculation needs no assumption and is relatively reliable.

In the above three cases, as long as the UE does not change the transmit beam, the base station will send, according to the quality of the received signal, indication for adjusting a power adjustment amount of the transmit beam of the UE, and the inaccuracy of the PL can be compensated.

In the above three cases, when it is assumed that the base station adopts multiple receive beams or when the base station actually adopts multiple receive beams, an integrated PL value of the PLs of the beam pairs between the transmit beam of the UE and the multiple beams of the base station is used for calculating the PL of the transmission power of the transmit beam of the UE. When the number of the transmit beams of the UE indicated by the base station is greater than 1, the operation described above is required between each transmit beam of the UE and the assumed receive beams of the base station, then the PL between each transmit beam of the UE and the assumed receive beam of the base station is calculated, and then the integrated PL value is determined. The method for determining the integrated PL value through multiple PLs may be one of: 1. acquiring the lowest value of the multiple PLs, or 2. calculating the weighted average of the multiple PLs.

Figure 4:
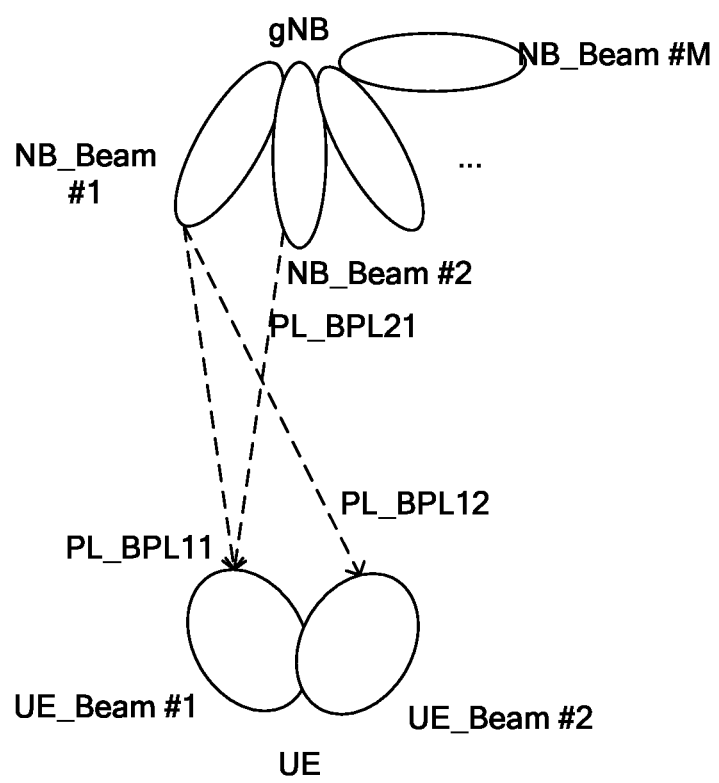
FIG. 4 is a diagram illustrating optional beam mapping between a base station and a terminal according to embodiment three of the present disclosure.

FIG. 4 is a diagram illustrating optional beam mapping between the base station and the terminal according to embodiment three of the present disclosure. As shown in FIG. 4, M beams of the base station are recorded as: NB_Beam #1-NB_Beam #M. N beams of the UE are recorded as: UE_Beam #1-UE_Beam #N.

When the base station transmits the downlink reference signal on NB_Beam #1, the UE receives the downlink reference signal on different receive beams and calculates PLs of corresponding BPLs, for example, PL_BPL11 is the PL of the link between NB_Beam #1 and UE_Beam #1, and PL_BPL12 is the PL of the link between NB_Beam #1 and UE_Beam #2 and so on. It is assumed that:

$$PL\_BPL11=50\ dB, PL\_BPL21=65\ dB, PL\_BPL31=60\ dB,$$

$$PL\_BPL12=72\ dB, PL\_BPL22=80\ dB, PL\_BPL32=63\ dB,$$

$$PL\_BPL13=53\ dB, PL\_BPL23=58\ dB, PL\_BPL33=75\ dB.$$

If the transmit/receive beam reciprocity (TX/RS beam correspondence) on the UE side is satisfied, and the UE explicitly knows that uplink transmission of a PUSCH/PUCCH/SRS uses UE_Beam #2 as the transmit beam and uses NB_Beam #1 as the receive beam, then the PL of the downlink may be used as the PL of the uplink. That is, PL_BPL 12 of the downlink is used for calculating the transmission power of the uplink transmission.

If the indication information from the base station indicates only the receive beam for the uplink transmission, the UE may determine the transmit beam for the uplink transmission by itself. That is, the transmit beam and the receive beam for the uplink transmission are both determined.

In the case that the transmit beam/receive beam reciprocity is satisfied on the UE side, if only the transmit beam UE_Beam #3 for the uplink transmission is specified in uplink-resource indication from the base station but the receive beam is uncertain, the UE assumes that the receive beam selected by the base station is one or more receive beams best matching the specified transmit beam for the uplink transmission. The best matching means that the PL of the corresponding uplink is the lowest. Since the reciprocity is satisfied, the best matching also means that the PL of the corresponding downlink is the lowest. For the PL values described above, the beams most matching with UE_Beam #3 are NB_Beam #1, NB_Beam #2 and NB_Beam #3 in order. Since PL_BPL33 (i.e., 75 dB) is relatively large, NB_Beam #3 may not be considered. In a practical system, a pathloss threshold may be set, and the path whose pathloss is greater than the threshold is not used for the calculation of PL of an uplink path. Assuming that the pathloss threshold of this example is 65 dB, then the UE assumes that the base station may use NB_Beam #1 and/or NB_Beam #2 as the receive beam. The PL results of downlink beam pair links between the transmit beam of the UE and possible receive beams (set) of the base station are used for calculating the PL of the uplink transmission.

In the case that the transmit beam/receive beam reciprocity is not completely satisfied on the UE side (that is, the optimal downlink transmit and receive beam pair determined by the UE according to the measurement result of the downlink does not correspond to the same beam pair between the base station and UE as the optimal transmit and receive beam pair of the uplink measured by the base station) and the measurement value of the downlink PL of the optimal beam pair of the uplink does not exceed the specified threshold, this indicates that the measurement result of the downlink and the measurement result of the uplink are not completely reciprocal for the selected beam pair, but the measured PL for the downlink beam pair still has reference value for the PL of the same uplink beam pair.

In the case that the transmit beam/receive beam reciprocity is not completely satisfied on the UE side, if the uplink-resource indication from the base station indicates that the transmit beam for the uplink transmission is UE_Beam #3 and the receive beam for the uplink transmission is NB_Beam #1, the UE may use PL_BPL13 which equals to 53 dB to calculate the transmission power. Alternatively, PL_BPL13 which equals to 53 dB and an offset are used for calculating the transmission power, where the offset is indicated by the base station. Alternatively, the UE selects a beam (set) of the base station corresponding to a downlink reference signal satisfying a certain channel feature assumption with a downlink reference signal whose transmit beam is NB_Beam #1, and uses the PL of a beam pair between the selected beam (set) of the base station and the UE_Beam #3 of the UE to calculate the PL of the uplink transmission.

In the case that the transmit beam/receive beam reciprocity is not completely satisfied on the UE side, if the uplink-resource indication from the base station indicates the transmit beam for the uplink transmission and the receive beam for the uplink transmission is unknown, the UE assumes the receive beam (set) of the base station according to the transmit beam. The PL results of the downlink beam pair links between the transmit beam of the UE and the possible receive beam (set) of the base station are used for calculating the PL of the uplink transmission.

In the case that the reciprocity is completely unsatisfied, if the UE can determine the transmit beam for the uplink transmission and the receive beam for the uplink transmission, the base station needs to indicate the PL of the corresponding uplink and measured by the base station. The base station updates the PL of the beam pair in use according to needs, and corrects the PL according to a closed-loop power adjustment policy. Alternatively, the UE uses a predefined PL value, and the base station sends a closed-loop power-control adjustment amount for correction. Alternatively, the base station directly calculates the required transmission power of the uplink, and indicates the required transmission power of the uplink to the UE. Alternatively, the base station directly indicates the transmission power to the UE only in the first transmission, and the UE only sends an instruction of a relative adjustment amount for modification in the subsequent transmission.

In the case that the reciprocity is completely unsatisfied, if the UE can determine the transmit beam for the uplink transmission and the receive beam for the uplink transmission is unknown, UE uses the predefined PL value and the base station sends the closed-loop power-control adjustment amount for correction, or the base station directly calculates the required transmission power of the uplink and indicates the required transmission power of the uplink to the UE, or the base station directly indicates the transmission power to the UE only in the first transmission and the UE only sends the instruction of the relative adjustment amount for modification in the subsequent transmission.

When there are multiple beams for uplink transmission, the transmission power of each transmit beam may be determined according to the method described above, and then whether the sum of transmission power of all transmit beams exceeds the maximum power limitation of the UE is determined. If the limitation is exceeded, one of the following processing is performed.

Manner 1: The power required by each transmit beam is scaled down so that total power does not exceed the maximum power limitation.

Manner 2: Transmission on a beam requiring a low transmission power is performed preferentially, and the transmission power of a beam requiring a high transmission power is reduced for transmission.

For example, the transmission power required by transmit beam 1, transmit beam 2 and transmit beam 3 of the UE is 100 mW, 50 mW, and 200 mW respectively. If the maximum power limitation of the power of the UE is 300 mW, then in manner 1, the transmission power of all beams is scaled down and the scale factor is 300/(100+50+200)=0.857; and in manner 2, transmission on beam 2 and transmission on beam 1 are preferentially guaranteed, and the remaining power is 150 mW which is used for transmission on beam 3. 150 mW is equivalent to 0.75 times the required transmission power of beam 3.

In the above description, when multiple PL values are used for calculating the transmission power of the transmission, the integrated PL value is determined. The determination method may be any one of: 1. selecting the maximum value of the multiple PLs; 2. selecting the minimum value of the multiple PLs; and 3. calculating a weighted average of the multiple PLs. The integrated PL value is set as the uplink PL values of all BPLs between the corresponding UE-side beam (group) and beam (group) of the base station, and is directly used for calculating the transmission power.

Finally, the uplink PL values and the downlink PL values of all the beam pairs between the base station and the UE may be obtained.

In a special implementation, the UE may not maintain the PL values of all beam pairs in consideration of resource consumption. Since a beam correspond to high PL value is not of practical use, the UE may allocate no dedicated resource for maintenance or allocate a resource but register the resource to an invalid value.

In summary, for calculating uplink power, the PL values of all or part of the beam pairs between the base station and the UE are maintained on the UE side.

The base station schedules the UE to send the SRS, measures the SRS to calculate the uplink PL, and feeds back the PLs of all or part of uplink-direction beam pairs to the UE. The UE modifies the PLs of the corresponding uplink BPLs.

When the uplink transmission exists between the UE and multiple TRPs or multiple gNBs, the UE needs to consider differences of multiple receiver points when calculating the transmission power. The transmission power selected by the UE needs to ensure that all receiver points can successfully perform demodulation.

The UE separately calculates transmission power required for transmission to the multiple receiver points, and uses the maximum transmission power as the transmission power for transmission.

Preferred Embodiment Two

A base station may use a feature of a reference signal to indicate part of uplink scheduling information. For example, a transmit beam indicated in the uplink scheduling information may be the same as the transmit beam for one or several uplink reference signals previously sent by a UE; and a receive beam indicated by the uplink scheduling information may be the same as the transmit beam for one or several downlink reference signals previously sent by the base station.

The reference signal described above used by the base station to indicate the uplink scheduling information is a second reference signal. The preceding downlink reference signal used for measuring the PL of a downlink is a first reference signal.

The first reference signal includes at least one of a CSI-RS, an SSS, or a DMRS of a PBCH.

The second reference signal includes at least one of the CSI-RS, an SRS, the SSS, or the DMRS of the PBCH.

The CSI-RS/SSS/DMRS of the PBCH is a downlink reference signal, and the SRS is an uplink reference signal.

When the first reference signal is the downlink reference signal and the second reference signal also includes the downlink reference signal, the second-type reference signal is a subset of the first-type reference signal or includes all first-type reference signal. For example, 5 CSI-RSs in total exist on a base-station side and are in one-to-one correspondence with 5 transmit beams, and the second reference signal only includes one specific CSI-RS among the 5 CSI-RSs, and one transmit beam of the base station may be determined through the one specific CSI-RS.

The second reference signal may include indication information about a downlink reference-signal resource and/or an uplink reference-signal resource. In the following, the case where the downlink reference signal is the CSI-RS and the uplink reference signal is the SRS is illustrated as an example.

The base station may specify a transmit beam (group) for uplink transmission in the scheduling information for the UE by sending an indication about SRS resources. The indication about SRS resources may use an index value to identify one or more resources from a SRS resource set known by both the base station and the UE. The corresponding transmit beam in the SRS resource used by the SRS is used for determining the transmit beam (group) used for the uplink transmission for the UE.

The base station may specify the transmit beam (group) for the uplink transmission in the scheduling information for the UE by sending an indication about CSI-RS resources. The indication about CSI-RS resources may use an index value to identify one or more CSI-RS resources from a CSI-RS resource set known by both the base station and the UE. The corresponding transmit beam in the CSI-RS resource used by the CSI-RS is used for determining a receive beam (group) used for the uplink transmission for the UE.

The base station may send, in the scheduling information, the indication about the CSI-RS resource and/or the indication about the SRS resource corresponding to the transmit beam (group) and/or the receive beam (group) of the uplink transmission, respectively.

When the base station indicates only a transmit mode for the uplink transmission of the UE, the UE assumes a receive beam (group) of the base station according to the transmit beam (group), and calculates the PL of the uplink transmission from one or more downlink PLs according to the assumed receive beam (group).

When the base station indicates only the receive beam (group) for the uplink transmission for the UE, the UE selects the optimal transmit beam (group) according to the receive beam (group), and calculates the PL of uplink transmission from one or more downlink PLs according to a determined transmit-receive beam situation.

The base station may also indicate no transmit or receive beam (group) for the uplink transmission in scheduling information of the uplink transmission, and at this time, the UE determines the transmit mode and/or a receive mode of the uplink transmission in a predefined manner. For example, the base station adopts a transmit beam corresponding to a transmit mode of control information where the scheduling information is located as the receive beam for the uplink transmission, and the UE adopts a receive beam corresponding to a receive mode of the control information where the scheduling information is located as the transmit beam for the uplink transmission.

Preferred Embodiment Three

A UE determines a transmit mode of uplink transmission according to an indication, sent by the base station, about a resource of a second reference signal. The transmit mode includes a transmit beam or beam group.

Alternatively, the UE determines the transmit mode and a receive mode of the uplink transmission, a beam pair link (BPL) or a beam pair link group (BPL group) according to the indication about the resource of the second reference signal, sent by the base station. The beam pair link group refers to multiple BPLs, for example, links between a downlink receive beam set (DL Rx beam set) or a UE antenna group and downlink transmit beams.

The UE maintains power adjustment amounts for beams (groups) or BPLs (groups) of the UE. Different channels (signals) such as PUSCH, PUCCH and SRS are in one-to-one correspondence with different power adjustment amounts. The PUSCH and the SRS may share a power adjustment amount. Therefore, the UE determines the power adjustment amounts for different channels (signals) of the beams (groups) or BPLs (groups) described above. The PUSCH and the PUCCH are channels, and the SRS is the signal.

Alternatively, the UE determines power adjustment amounts only for different channels (signals) of part of the beams (groups) or BPLs (groups). The part of the beams (groups) or BPLs (groups) refers to active beams (groups) or BPLs (groups). Being active refers to that the base station continuously sending instructions to update the power adjustment amount of a link in which each active beam (group) participates or a link of each active BPL (group).

This power adjustment amount is a power adjustment amount locally recorded by the UE. The UE receives power adjustment information from the base station and adjusts the power adjustment value corresponding to a beam (group) or a BPL (group) determined in the power adjustment information from the base station. The power adjustment amount supports both an accumulation-adjustment mode and a direct-configuration mode. The accumulation-adjustment mode is that after receiving the power adjustment information from the base station, the UE updates a local storage value by accumulating the power adjustment value with the local storage value; and the direct-configuration mode is to directly replace the local stored value with the power adjustment value of the base station.

The power adjustment amount has a validity period. If no update is performed a predetermined time, the power adjustment amount expires and invalid. The predetermined time is a time configured by the base station for the UE, and may be the number of slots, the number of OFDM symbols, or several microseconds, milliseconds or seconds.

When the UE needs to perform the uplink transmission and a beam (group) for which the power adjustment amount is valid is used for transmission, the power adjustment amount of the beam (group) and the PL of the beam are used for calculating transmission power.

When the UE adopts a beam (group) for which the power adjustment amount does not exist or has expired as a transmit beam to perform transmission, reference may be made to an unexpired power adjustment amount of other beams (groups) of the UE. When the number of beams (groups) or BPLs (groups) satisfying the condition is greater than 1, multiple reference power adjustment amount values jointly determine an integrated power adjustment amount. When the number of the beams (groups) or BPLs (groups) satisfying the condition is 0, the power adjustment amount used is 0, or a predefined value is used. The specific method for determining one power adjustment amount by using more than one reference value is one of the following methods: 1. selecting the maximum value of the multiple reference values, 2. selecting the minimum value of the multiple reference values, or 3. calculating a weighted average of the multiple reference values. For example, the UE has three beams, denoted as Beam_1, Beam_2 and Beam_3 respectively, and the UE measures and records PL values for Beam_1 and Beam_2.

The UE records power adjustment amounts f_Beam_1, f_Beam_2 and f_Beam_3 for Beam_1, Beam_2 and Beam_3, respectively, and initial values of f_Beam_1, f_Beam_2 and f_Beam_3 are all 0.

The base station only sends a power adjustment amount for Beam_1 of the UE to keep a continuous update. After receiving power adjustment amount information from the base station for Beam_1, the UE updates f_Beam_1.

When the UE decides to perform the uplink transmission through Beam_2, if the UE finds that Beam_2 has no valid transmit-power adjustment amount and the transmit-power adjustment amount of Beam_1 is valid, then the transmit-power adjustment amount f_Beam_1 of Beam_1 is adopted to calculate the transmission power for the uplink transmission through the Beam_2.

The beam (group) mentioned in the present disclosure refers to a beam or a beam group.

The beam group may be interchanged with the concept of a beam set or a UE antenna group.

Preferred Embodiment Four

A UE sends a beam failure recovery request at the first power after finding a beam failure.

The beam failure recovery request may also be referred to as a beam resume request, and is used for requesting the base station to allocate a resource for beam training to find an available beam when performance of the current beam is lower than a threshold.

If the UE detects no response from the base-station side in one or more PDCCH search spaces after the beam failure recovery request is sent, the UE resends the beam failure recovery request at the second power.

Alternatively, after the beam failure recovery request is sent, if the UE detects no response from the base station in one or more search spaces and determines that the number of transmissions does not exceed a maximum transmission number and/or an accumulated duration does not exceed a timing threshold even if the beam failure recovery request is resent, the UE resends the beam failure recovery request at the second power.

If it is determined that the number of transmissions has reached the maximum transmission number and/or the accumulated duration has reached or exceeded the timing threshold, the UE needs to notify the higher layer of this matter.

The first power is determined in the manner described below.

The UE calculates the first power based on the PL and the power adjustment amount corresponding to a selected beam (set) or BPL (group).

If the power adjustment amount is not maintained or has expired on the beam (set) or BPL (group) selected by the UE, then the latest updated power adjustment amount of other beams or BPLs is selected.

Alternatively, the power adjustment amount used for the first transmission may be a predefined power adjustment amount value, and this initialization value is directly configured.

Alternatively, the power adjustment amount used for the first transmission is 0.

The second power is determined in the manner described below.

On the premise that the maximum transmission power is not exceeded, the second power is a sum of transmission power of a previous transmission of the beam failure recovery request and a power rampup value, as shown in the formula below:

$$P=\min\{PCMAX, P\_LastTX+\text{delta}P\_\text{rampup}\} \text{ [dBm]}$$

PCMAX denotes the maximum transmission power that the UE can use to send the beam failure recovery request through the current beam (set) in the current serving cell. The current serving cell refers to a component carrier used by the UE to send the beam failure recovery request. This value is configured by the base station for each component carrier, or configured by the base station for each component carrier of each UE antenna group. The UE antenna group refers to a UE antenna panel or a subarray.

The power ramp up value deltaP_rampup is directly configured.

Alternatively, the power ramp value deltaP_rampup is determined by the UE in the manner described below.

$$\text{delta}P\_\text{rampup}=\max\{\text{delta}P\_\text{rampup}\_0, (PCMAX-P\_\text{first})/(M\_\text{trans}-1)\}$$

The deltaP_rampup_0s denotes a default power rampup value, and may be configured by the base station independent of each other, or may be predefined to be equal to the preamble power rampup value in a random-access process. PCMAX denotes the maximum transmission power that the UE can use to send the beam failure recovery request on the current beam (set) in the current serving cell. P_first denotes the first transmission power. M_trans denotes the maximum transmission number of the beam failure recovery request and is directly configured.

The relationship between a beam used for the retransmission and a beam used for the previous transmission is in one of the manners described below.

1. The same transmit beam (set) and receive beam (set) are used for the retransmission and the previous transmission.

2. The same transmit beam (set) is used for the retransmission and the previous transmission. 3. Different transmit beams (sets) are used for the retransmission and the previous transmission. The beam failure recovery request and a PUSCH channel may share the transmission power adjustment amount.

Alternatively, the transmission power adjustment amount of the beam failure recovery request and the transmission power adjustment amount of the PUSCH channel may be determined independent of each other.

Preferred Embodiment Five

When a UE performs uplink beam training or beam sweeping, one or more SRS resources satisfying a channel feature assumption, or SRS antenna ports indicated by the same downlink reference-signal index under reciprocity uses the same transmission power. The channel feature assumption includes one of a QCL assumption, a spatial QCL assumption or a reciprocal QCL assumption.

During beam training, a method for setting grouping power is setting through PLs and power adjustment amounts of current beams.

A port herein is also an antenna port. The port and the antenna port have the same meaning and are interchangeable.

If multiple groups of SRS ports exist in the UE, resources of SRS ports in each group use the same transmission power, and transmission power of different group is determined independent of each other.

The relationship of the SRS port, an SRS resource and an SRS transmit beam is described below.

Each UE may have at least one SRS resource.

Each SRS resource includes at least one SRS transmit beam.

Each SRS transmit beam corresponds to at least one SRS port.

A method for independently determining power of each group of SRS antenna ports that use the same transmission power includes the steps described below.

If beams or BPLs with valid power adjustment amounts exit in this beam group, the power adjustment amounts and corresponding PLs of these beams or BPLs are used for calculating the transmission power of these beams or BPLs.

The phenomenon where these beams or BPLs have valid power adjustment amounts means that the power adjustment amounts for the corresponding beams or BPLs have been maintained by the UE and are unexpired. X minimum transmission powers are used to determine the transmission power of this beam group. X is a predetermined or configurable positive integer. The determination method may be one of: 1. acquiring the minimum value of the X transmission powers, 2. acquiring the maximum value of the X transmission powers, or 3. calculating a weighted average of the X transmission powers.

If no beam or BPL with a valid power adjustment amount exists in this beam group, but a beam or BPL with a valid PL exists in this beam group and a beam or BPL with the valid power adjustment amount exists in other beam groups, then reference is made to the power adjustment amount of other beam groups for power adjustment amounts of this beam group, the power adjustment amounts and the corresponding PLs of these beams or BPLs are used for calculating the transmission power. The valid PL refers to a value less than a certain threshold and cannot exceed a validity period. Then according to the method described above, X minimum transmission powers are taken to determine the transmission power of the beams. Specifically, the reference method may be one of: 1. acquiring the minimum value of reference transmission powers, 2. acquiring the maximum value of the reference transmission powers, or 3. calculating a weighted average of the reference powers.

If no beam or BPL with the valid power adjustment amount exists in this beam group and no beam or BPL with the valid PL exists in this beam group, then the maximum transmission power of other beam groups is taken and set as the transmission power of this beam group.

If multiple beam groups exist in the UE, the beam in each group uses the same transmission power, and certain power offsets exist between the groups. The power offset between the groups is determined by the UE from historical statistics or are directly configured. A standard transmission power is calculated from the PL and the power adjustment amount of a beam (group) with the latest maintained power adjustment amount, and for other groups, the transmission power of each group is a sum of a respective offset value relative to this beam (group) and the standard value.

If the UE determines the power offset from historical statistics, then the UE needs to notify the base station of the power offset.

Embodiment Four

An embodiment of the present disclosure further provides a storage medium. Optionally, in the embodiment of the present disclosure, the storage medium described above may be configured to store program codes for performing the method for determining transmission power according to above-mentioned embodiment one.

Optionally, in the embodiment of the present closure, the storage medium described above may be located in any one computer terminal in a computer terminal group in a computer network, or may be located in any one mobile terminal in a mobile terminal group.

Optionally, in the embodiment of the present disclosure, the storage medium is configured to store program codes for performing the steps described below.

In S1, a terminal measures a first reference signal sent from a base station, and determines a pathloss of the first reference signal.

In S2, the terminal determines a type of uplink transmission and an association relationship between the uplink transmission and the first reference signal according to indication from the base station, and determines a pathloss of the uplink transmission according to the type of the uplink transmission, the association relationship and the pathloss of the first reference signal.

In S3, the terminal determines a power adjustment amount of the uplink transmission according to the indication from the base station.

In S4, the terminal determines the transmission power of the uplink transmission according to at least one of: the pathloss of the uplink transmission and the power adjustment amount of the uplink transmission.

The serial numbers of the embodiments described above of the present disclosure are merely for ease of description and do not indicate superiority and inferiority of the embodiments.

In the embodiments described above of the present disclosure, the description of each embodiment has its own emphasis. For a part not described in detail in one embodiment, reference may be made to a related description of other embodiments.

It should be understood that the technical content disclosed in the embodiments of the present application may be implemented in other ways. The device embodiments described above are merely illustrative. For example, a unit division is merely a logical function division, and, in practice, the unit division may be implemented in other ways. For example, multiple units or components may be combined or may be integrated into another system, or some features may be ignored or not executed. Additionally, the presented or discussed mutual coupling, direct coupling or communication connections may be indirect coupling or communication connections via interfaces, units or modules, or may be electrical or in other forms.

The units described above as separate components may or may not be physically separated. Components presented as units may or may not be physical units, i.e., may be located in one place or may be distributed on multiple network units. Part or all of these units may be selected according to practical requirements to achieve the objects of the solution in the embodiments of the present disclosure.

Additionally, various functional units in each embodiment of the present disclosure may be integrated into one processing unit, or each unit may be physically presented separately, or two or more units may be integrated into one unit. The integrated unit may be implemented by hardware or a software functional unit.

The integrated unit may be stored in a computer-readable storage medium if implemented in the form of the software functional unit and sold or used as an independent product. Based on this understanding, the solution provided by the present disclosure substantially, or the part contributing to the existing art, may be embodied in the form of a software product. The computer software product is stored in a storage medium and includes several instructions for enabling a computer device (which may be a personal computer, a server, a network device or the like) to execute all or part of the steps in the methods provided by the embodiments of the present disclosure. The preceding storage medium includes a USB flash drive, a read-only memory (ROM), a random access memory (RAM), a mobile hard disk, a magnetic disk, an optical disk or another medium capable of storing program codes.

The above are only preferred embodiments of the present disclosure and are not intended to limit the present disclosure. For those skilled in the art, the present disclosure may have various modifications and variations. Any modifications, equivalent substitutions, improvements and the like made within the spirit and principle of the present disclosure should fall within the scope of the present disclosure.

What is claimed is:

1. A method comprising:
   determining, by the communication device, a transmit mode of an uplink transmission according to indication information about a resource of a first reference signal,
   wherein the resource of the first reference signal comprises a time-domain resource, a frequency-domain resource or a transmit mode for transmission of the first reference signal, and
   wherein the indication information about the resource of the first reference signal is used for determining Y resources of the first reference signal from X resources of the first reference signal, X is an integer greater than or equal to 2, Y is an integer greater than or equal to 1, and Y is less than X.

2. The method of claim 1, wherein a second reference signal used to determine a transmission power of the uplink transmission comprises a channel state information reference signal or a secondary synchronization signal, and the first reference signal comprises a sounding reference signal.

3. A device comprising:
   at least one processor configured to:
   determine a transmit mode of an uplink transmission according to indication information about a resource of a first reference signal;
   wherein the resource of the first reference signal comprises a time-domain resource, a frequency-domain resource or a transmit mode for transmission of the first reference signal; and
   wherein the indication information about the resource of the first reference signal is used for determining Y resources of the first reference signal from X resources of the first reference signal, X is an integer greater than or equal to 2, Y is an integer greater than or equal to 1, and Y is less than X.

4. The device of claim 3, wherein a second reference signal used to determine a transmission power of the uplink transmission comprises a channel state information reference signal or a secondary synchronization signal, and the first reference signal comprises a sounding reference signal.

5. The device of claim 3, wherein the device comprises a wireless terminal.

6. A non-transitory storage medium storing computer programs, the computer programs when executed cause one or more processors to:
   determine a transmit mode of an uplink transmission according to indication information about a resource of a first reference signal;
   wherein the resource of the first reference signal comprises a time-domain resource, a frequency-domain resource or a transmit mode for transmission of the first reference signal; and
   wherein the indication information about the resource of the first reference signal is used for determining Y resources of the first reference signal from X resources of the first reference signal, X is an integer greater than or equal to 2, Y is an integer greater than or equal to 1, and Y is less than X.

7. The non-transitory storage medium of claim 6, wherein a second reference signal used to determine a transmission power of the uplink transmission comprises a channel state information reference signal or a secondary synchronization signal, and the first reference signal comprises a sounding reference signal.

* * * * *